US012626909B2

(12) United States Patent
Oh et al.

(10) Patent No.: US 12,626,909 B2
(45) Date of Patent: May 12, 2026

(54) NEGATIVE ELECTRODE ACTIVE MATERIAL, NEGATIVE ELECTRODE INCLUDING SAME, SECONDARY BATTERY INCLUDING SAME, AND METHOD FOR MANUFACTURING NEGATIVE ELECTRODE ACTIVE MATERIAL

(71) Applicant: LG ENERGY SOLUTION, LTD., Seoul (KR)

(72) Inventors: Ilgeun Oh, Daejeon (KR); Semi Park, Daejeon (KR); Sun Young Shin, Daejeon (KR); Yong Ju Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 517 days.

(21) Appl. No.: 18/270,780

(22) PCT Filed: Jul. 12, 2022

(86) PCT No.: PCT/KR2022/010143
§ 371 (c)(1),
(2) Date: Jul. 3, 2023

(87) PCT Pub. No.: WO2023/018025
PCT Pub. Date: Feb. 16, 2023

(65) Prior Publication Data
US 2024/0063372 A1 Feb. 22, 2024

(30) Foreign Application Priority Data

Aug. 13, 2021 (KR) ........................ 10-2021-0107525
Jan. 20, 2022 (KR) ........................ 10-2022-0008564

(51) Int. Cl.
| *H01M 4/36* | (2006.01) |
| *H01M 4/02* | (2006.01) |
| *H01M 4/38* | (2006.01) |
| *H01M 4/58* | (2010.01) |
| *H01M 4/583* | (2010.01) |

(52) U.S. Cl.
CPC ........... *H01M 4/366* (2013.01); *H01M 4/386* (2013.01); *H01M 4/582* (2013.01); *H01M 4/583* (2013.01); *H01M 2004/021* (2013.01); *H01M 2004/027* (2013.01)

(58) Field of Classification Search
CPC ............................................. H01M 4/36–386
See application file for complete search history.

(56) References Cited

U.S. PATENT DOCUMENTS

| | | | |
|---|---|---|---|
| 9,315,882 B2 | 4/2016 | Lee et al. | |
| 10,644,309 B2 | 5/2020 | Do et al. | |
| 2006/0051670 A1 | 3/2006 | Aramata et al. | |
| 2011/0177388 A1 | 7/2011 | Bae et al. | |
| 2014/0030597 A1 | 1/2014 | Jung et al. | |
| 2016/0233484 A1* | 8/2016 | Hirose | H01M 4/48 |
| 2018/0097229 A1 | 4/2018 | Jo et al. | |
| 2020/0099052 A1 | 3/2020 | Choi et al. | |
| 2020/0112019 A1* | 4/2020 | Oh | H01M 4/485 |
| 2020/0266424 A1 | 8/2020 | Choi et al. | |
| 2020/0335769 A1 | 10/2020 | Chae et al. | |
| 2020/0343544 A1 | 10/2020 | Choi et al. | |
| 2021/0143433 A1 | 5/2021 | Lee et al. | |
| 2021/0175488 A1* | 6/2021 | Choi | H01M 10/0525 |
| 2021/0257617 A1* | 8/2021 | Oh | H01M 4/405 |
| 2022/0181602 A1 | 6/2022 | Oh et al. | |
| 2022/0231280 A1 | 7/2022 | Lee et al. | |
| 2023/0361279 A1* | 11/2023 | Ma | H01M 4/049 |
| 2025/0226415 A1* | 7/2025 | Oh | H01M 4/386 |

FOREIGN PATENT DOCUMENTS

| | | |
|---|---|---|
| CN | 106129375 A | 11/2016 |
| CN | 109728259 A | 5/2019 |
| CN | 109904394 A | 6/2019 |
| CN | 112219295 A | 1/2021 |
| CN | 111653733 B | 9/2021 |
| JP | 2003-263984 A | 9/2003 |
| JP | 2006-100255 A | 4/2006 |
| JP | 2011-513912 A | 4/2011 |
| JP | 2014-71948 A | 4/2014 |
| JP | 5692535 B2 | 4/2015 |
| JP | 2020-115443 A | 7/2020 |

(Continued)

OTHER PUBLICATIONS

Japanese Office Action for Japanese Application No. 2023-544144, dated Aug. 26, 2024, with English translation.

(Continued)

*Primary Examiner* — Haroon S. Sheikh

(74) *Attorney, Agent, or Firm* — Birch, Stewart, Kolasch & Birch, LLP

(57) ABSTRACT

A negative electrode active material, a negative electrode including silicon-containing particles comprising $SiO_x$, wherein $0<x<2$, and a Li compound, and a carbon layer present on at least a part of a surface of the silicon-containing particles; and a layer comprising LiF present on at least a part of the silicon-containing particles having the carbon layer. During analysis by X-ray photoelectron spectroscopy (XPS), an atomic ratio (F/O ratio) of F relative to O is 0.45 or more and an atomic ratio (F/C ratio) of F relative to C is 0.5 or less.

13 Claims, No Drawings

(56) References Cited

FOREIGN PATENT DOCUMENTS

| | | | |
|---|---|---|---|
| JP | 2021-501976 | A | 1/2021 |
| JP | 2021-77640 | A | 5/2021 |
| KR | 10-2013-0074826 | A | 7/2013 |
| KR | 10-1437074 | B | 9/2014 |
| KR | 10-2017-0057437 | A | 5/2017 |
| KR | 10-2018-0036456 | A | 4/2018 |
| KR | 10-2019-0068476 | A | 6/2019 |
| KR | 10-2019-0115706 | A | 10/2019 |
| KR | 10-2020-0001120 | A | 1/2020 |
| KR | 10-2244953 | B1 | 4/2021 |
| KR | 10-2245126 | B1 | 4/2021 |
| KR | 10-2021-0074187 | A | 6/2021 |
| KR | 10-2023-0025316 | A | 2/2023 |

OTHER PUBLICATIONS

International Search Report for PCT/KR2022/010143 (PCT/ISA/210) mailed on Nov. 1, 2022.
Japanese Office Action for Japanese Application No. 2023-544144, dated Feb. 25, 2025, with English translation.
Extended European Search Report for European Application No. 22856026.4, dated Jun. 30, 2025.

* cited by examiner

NEGATIVE ELECTRODE ACTIVE MATERIAL, NEGATIVE ELECTRODE INCLUDING SAME, SECONDARY BATTERY INCLUDING SAME, AND METHOD FOR MANUFACTURING NEGATIVE ELECTRODE ACTIVE MATERIAL

TECHNICAL FIELD

This application claims priority to and the benefit of Korean Patent Application Nos. 10-2021-0107525 and 10-2022-0008564 filed in the Korean Intellectual Property Office on Aug. 13, 2021 and Jan. 20, 2022, respectively, the entire contents of which are incorporated herein by reference.

The present invention relates to a negative electrode active material, a negative electrode including the same, a secondary battery including the same and a method for preparing a negative electrode active material.

BACKGROUND ART

Recently, with the rapid spread of electronic devices using batteries such as mobile phones, notebook-sized computers, and electric vehicles, the demand for small and lightweight secondary batteries having relatively high capacity is rapidly increasing. In particular, lithium secondary batteries are lightweight and have high energy density, and thus have attracted attention as driving power sources for mobile devices. Accordingly, research and development efforts to improve the performance of lithium secondary batteries have been actively conducted.

In general, a lithium secondary battery includes a positive electrode, a negative electrode, a separator interposed between the positive electrode and the negative electrode, an electrolyte solution, an organic solvent and the like. Further, for the positive electrode and the negative electrode, an active material layer each including a positive electrode active material and a negative electrode active material may be formed on a current collector. In general, lithium-containing metal oxides such as $LiCoO_2$ and $LiMn_2O_4$ have been used as the positive electrode active material for the positive electrode, and lithium-free carbon-based active materials and silicon-based active materials have been used as the negative electrode active material for the negative electrode.

Among the negative electrode active materials, the silicon-based active material is attracting attention because the silicon based active material has a high capacity and excellent high-speed charging characteristics compared to the carbon-based active material. However, the silicon-based active material has a disadvantage in that the initial efficiency is low because the degree of volume expansion/contraction due to charging/discharging is large and the irreversible capacity is large.

Meanwhile, among the silicon-based active materials, a silicon-based oxide, specifically, a silicon-based oxide represented by $SiO_x$ (0<x<2) has an advantage in that the degree of volume expansion/contraction due to charging/discharging is low compared to other silicon-based active materials such as silicon (Si). However, the silicon-based oxide still has a disadvantage in that the initial efficiency is lowered depending on the presence of the irreversible capacity.

In this regard, studies have been continuously conducted to reduce irreversible capacity and improve initial efficiency by doping or intercalating a metal such as Li, Al, and Mg into silicon-based oxides. However, in the case of a negative electrode slurry including a metal-doped silicon-based oxide as a negative electrode active material, there is a problem in that the metal oxide formed by doping the metal reacts with moisture to increase the pH of the negative electrode slurry and change the viscosity thereof, and accordingly, there is a problem in that the state of the prepared negative electrode becomes poor and the charge/discharge efficiency of the negative electrode is reduced.

Accordingly, there is a need for the development of a negative electrode active material capable of improving the phase stability of a negative electrode slurry including a silicon-based oxide and improving the charge/discharge efficiency of a negative electrode prepared therefrom.

Korean Patent No. 10-0794192 relates to a method for preparing a carbon-coated silicon-graphite composite negative electrode material for a lithium secondary battery and a method for preparing a secondary battery including the same, but has a limitation in solving the above-described problems.

RELATED ART DOCUMENTS (Patent Document 1) Korean Patent No. 10-0794192

DETAILED DESCRIPTION OF THE INVENTION

Technical Problem

The present invention relates to a negative electrode active material, a negative electrode including the same, a secondary battery including the same and a method for preparing a negative electrode active material.

Technical Solution

An exemplary embodiment of the present invention provides a negative electrode active material including: silicon-based particles including $SiO_x$ (0<x<2) and a Li compound and having a carbon layer provided on at least a part of the surface thereof; and a layer including LiF provided on at least a part of the silicon-based particles, in which during analysis by X-ray photoelectron spectroscopy (XPS), an atomic ratio (F/O ratio) of F relative to O is 0.45 or more and an atomic ratio (F/C ratio) of F relative to C is 0.5 or less.

An exemplary embodiment of the present invention provides a method for preparing the negative electrode active material, the method including: forming silicon-containing particles including $SiO_x$ (0<x<2) and a Li compound and having a carbon layer provided on at least a part of the surface thereof; and forming a layer including LiF on at least a part of the silicon-containing particles by reacting the silicon-containing particles with a HF solution.

An exemplary embodiment of the present invention provides a negative electrode including the negative electrode active material.

An exemplary embodiment of the present invention provides a secondary battery including the negative electrode.

Advantageous Effects

The negative electrode active material according to an exemplary embodiment of the present invention can enhance a water-based processability by effectively removing a lithium by-product formed when silicon-based particles are doped with Li, and simultaneously can improve the service life performance by providing a layer including LiF on the silicon-based particles to act as an artificial SEI layer. Further, as on the particle surface, the atomic ratio (F/O ratio) of F relative to O is 0.45 or more and the atomic ratio (F/C ratio) of F relative to C satisfies 0.5 or less, a water-based processability can be remarkably improved.

Therefore, a negative electrode including the negative electrode active material according to an exemplary embodiment of the present invention and a secondary battery including the negative electrode have an effect of improving the discharge capacity, initial efficiency, resistance performance and/or service life characteristics of the battery.

BEST MODE

Hereinafter, the present specification will be described in more detail.

When one part "includes" one constituent element in the present specification, unless otherwise specifically described, this does not mean that another constituent element is excluded, but means that another constituent element may be further included.

When one member is disposed "on" another member in the present specification, this includes not only a case where the one member is brought into contact with another member, but also a case where still another member is present between the two members.

Terms or words used in the specification should not be interpreted as being limited to typical or dictionary meaning and should be interpreted with a meaning and a concept which conform to the technical spirit of the present invention based on the principle that an inventor can appropriately define a concept of a term in order to describe his/her own invention in the best way.

Singular expressions of the terms used in the present specification include plural expressions unless they have definitely opposite meanings in the context.

In the present specification, the crystallinity of a structure included in a negative electrode active material may be confirmed by X-ray diffraction analysis, the X-ray diffraction analysis may be performed using an X-ray diffraction (XRD) analyzer (trade name: D4-endavor, manufacturer: Bruker), and in addition to the apparatus, an apparatus used in the art may be appropriately employed.

In the present specification, the presence or absence of an element and the content of the element in a negative electrode active material can be confirmed by ICP analysis, and the ICP analysis may be performed using an inductively coupled plasma atomic emission spectrometer (ICPAES, Perkin Elmer 7300).

In the present specification, an average particle diameter ($D_{50}$) may be defined as a particle diameter corresponding to 50% of a cumulative volume in a particle size distribution curve (graph curve of the particle size distribution map) of the particles. The average particle diameter ($D_{50}$) may be measured using, for example, a laser diffraction method. The laser diffraction method can generally measure a particle diameter of about several mm from the submicron region, and results with high reproducibility and high resolution may be obtained.

Hereinafter, preferred exemplary embodiments of the present invention will be described in detail. However, the exemplary embodiments of the present invention may be modified into various other forms, and the scope of the present invention is not limited to the exemplary embodiments which will be described below.

4

<Negative Electrode Active Material>

An exemplary embodiment of the present invention provides a negative electrode active material including: silicon-containing particles including $SiO_x$ (0<x<2) and a Li compound, and a carbon layer on at least a part of the surface of the silicon-containing particles; and a layer including LiF present on at least a part of the silicon-containing particles having the carbon layer, in which during analysis by X-ray photoelectron spectroscopy (XPS), an atomic ratio (F/O ratio) of F relative to O is 0.45 or more and an atomic ratio (F/C ratio) of F relative to C is 0.5 or less.

The negative electrode according to an exemplary embodiment of the present invention includes silicon-based particles. The silicon-based particles include $SiO_x$ (0<x<2) and a Li compound, and may have a carbon layer provided on at least a part of the surface thereof.

The $SiO_x$ (0<x<2) may correspond to a matrix in the silicon-based particle. The $SiO_x$ (0<x<2) may be in a form including Si and $SiO_2$, and the Si may also form a phase. That is, the x corresponds to the number ratio of O for Si included in the $SiO_x$ (0<x<2). When the silicon-based particles include the $SiO_x$ (0<x<2), the discharge capacity of a secondary battery may be improved.

In an exemplary embodiment of the present invention, the silicon-based particles may include a Li compound.

The Li compound may correspond to a matrix in the silicon-based composite particle. The Li compound may be present in the form of at least one of a lithium atom, a lithium silicate, a lithium silicide, and a lithium oxide in the silicon-based particle. When the silicon-based particles include a Li compound, there is an effect that the initial efficiency is improved.

The Li compound is in a form in which the silicon-based particles are doped with the compound, and may be distributed on the surface and/or inside of the silicon-based particle. The Li compound is distributed on the surface and/or inside of the silicon-based particle, and thus may control the volume expansion/contraction of the silicon-based particles to an appropriate level, and may serve to prevent damage to the active material. Further, the Li compound may be contained in terms of reducing the ratio of the irreversible phase (for example, $SiO_2$) of the silicon-based oxide particles to increase the efficiency of the active material.

In an exemplary embodiment of the present invention, the Li compound may be present in the form of a lithium silicate. The lithium silicate is represented by $Li_aSi_bO_c$ (2≤a≤4, 0<b≤2, 2≤c≤5) and may be classified into crystalline lithium silicate and amorphous lithium silicate. The crystalline lithium silicate may be present in the form of at least one lithium silicate selected from the group consisting of $Li_2SiO_3$, $Li_4SiO_4$ and $Li_2Si_2O_5$ in the silicon-based particles, and the amorphous lithium silicate may consist of a complex structure in the form of $Li_aSi_bO_c$ (2≤a≤4, 0<b≤2, 2≤c≤5), and are not limited to the forms.

In an exemplary embodiment of the present invention, Li may be included in an amount of 0.1 parts by weight to 40 parts by weight or 0.1 parts by weight to 25 parts by weight based on total 100 parts by weight of the negative electrode active material. Specifically, the Li may be included in an amount of 1 part by weight to 25 parts by weight, more specifically 2 parts by weight to 20 parts by weight. There is a problem in that as the content of Li is increased, the initial efficiency is increased, but the discharge capacity is decreased, so that when the content satisfies the above range, appropriate discharge capacity and initial efficiency may be implemented.

The content of the Li element may be confirmed by ICP analysis. Specifically, after a predetermined amount (about 0.01 g) of the negative electrode active material is aliquoted, the negative electrode active material is completely decomposed on a hot plate by transferring the aliquot to a platinum crucible and adding nitric acid, hydrofluoric acid, or sulfuric acid thereto. Thereafter, a reference calibration curve is prepared by measuring the intensity of a standard liquid prepared using a standard solution (5 mg/kg) in an intrinsic wavelength of an element to be analyzed using an inductively coupled plasma atomic emission spectrometer (IC-PAES, Perkin-Elmer 7300). Thereafter, a pre-treated sample solution and a blank sample are each introduced into the apparatus, an actual intensity is calculated by measuring each intensity, the concentration of each component relative to the prepared calibration curve is calculated, and then the contents of the elements of the prepared negative electrode active material may be analyzed by converting the total sum so as to be the theoretical value.

In an exemplary embodiment of the present invention, the silicon-based particles may include an additional metal atom. The metal atom may be present in the form of at least one of a metal atom, a metal silicate, a metal silicide, and a metal oxide in the silicon-based particle. The metal atom may include at least one selected from the group consisting of Mg, Li, Al and Ca. Accordingly, the initial efficiency of the negative electrode active material may be improved.

The silicon-based particles according to an exemplary embodiment of the present invention have a carbon layer provided on at least a part of the surface thereof. In this case, the carbon layer may be in the form of being partially coated on at least a part of the surface, that is, the particle surface or being coated on the entire particle surface. By the carbon layer, conductivity is imparted to the negative electrode active material, and the initial efficiency, service life characteristics, and battery capacity characteristics of the secondary battery may be improved.

In an exemplary embodiment of the present invention, the carbon layer includes an amorphous phase.

In an exemplary embodiment of the present invention, the carbon layer includes amorphous carbon.

Further, the carbon layer may additionally include crystalline carbon.

The crystalline carbon may further improve the conductivity of the negative electrode active material. The crystalline carbon may include at least one selected in the group consisting of fullerene, carbon nanotubes and graphene.

The amorphous carbon may suppress the expansion of the silicon-based particles by appropriately maintaining the strength of the carbon layer. The amorphous carbon may be a carbon-based material formed using at least one carbide selected from the group consisting of tar, pitch and other organic materials, or a hydrocarbon as a source of a chemical vapor deposition method.

The carbide of the other organic materials may be a carbide of sucrose, glucose, galactose, fructose, lactose, mannose, ribose, aldohexose or ketohexose and a carbide of an organic material selected from combinations thereof.

The hydrocarbon may be a substituted or unsubstituted aliphatic or alicyclic hydrocarbon, or a substituted or unsubstituted aromatic hydrocarbon. The aliphatic or alicyclic hydrocarbon of the substituted or unsubstituted aliphatic or alicyclic hydrocarbon may be methane, ethane, ethylene, acetylene, propane, butane, butene, pentane, isobutane, hexane, or the like. Examples of the aromatic hydrocarbon of the substituted or unsubstituted aromatic hydrocarbon include benzene, toluene, xylene, styrene, ethylbenzene, diphenylmethane, naphthalene, phenol, cresol, nitrobenzene, chlorobenzene, indene, coumarone, pyridine, anthracene, phenanthrene, or the like.

In an exemplary embodiment of the present invention, the carbon layer may be included in an amount of 0.1 parts by weight to 50 parts by weight, 0.1 parts by weight to 30 parts by weight or 0.1 parts by weight to 20 parts by weight, based on total 100 parts by weight of the negative electrode active material. More specifically, the carbon layer may be included in an amount of 0.5 parts by weight to 15 parts by weight, 1 part by weight to 10 parts by weight or 1 part by weight to 5 parts by weight. When the above range is satisfied, it is possible to prevent a decrease in the capacity and efficiency of the negative electrode active material.

In an exemplary embodiment of the present invention, the carbon layer may have a thickness of 1 nm to 500 nm, specifically 5 nm to 300 nm. When the above range is satisfied, the conductivity of the negative electrode active material is improved, the volume change of the negative electrode active material is readily suppressed, and side reactions between an electrolytic solution and the negative electrode active material are suppressed, so that there is an effect the initial efficiency and/or service life of a battery is/are improved.

Specifically, the carbon layer may be formed by a chemical vapor deposition (CVD) method using at least one hydrocarbon gas selected from the group consisting of methane, ethane and acetylene.

The negative electrode active material according to an exemplary embodiment of the present invention includes a layer including LiF provided on at least a part of the silicon-based particles.

The layer including LiF may be in the form of being coated on at least a part of a silicon-based composite particle having a carbon layer provided on the surface. That is, the layer including LiF may be in the form of being partially coated on the particle surface or being coated on the entire particle surface. Examples of a shape of the layer including LiF include an island type, a thin film type, or the like, but the shape of the layer including LiF is not limited thereto.

The layer including LiF may be provided on at least a part of the carbon layer. That is, the layer including LiF is coated adjacently on the carbon layer, and thus may be provided in the form of a layer including particle-carbon layer-LiF including $SiO_x$ ($0<x<2$) and a Li compound.

The layer including LiF may be provided on a region in which the carbon layer is not provided on the particle surface including the $SiO_x$ ($0<x<2$) and the Li compound. That is, the layer including LiF is coated adjacently on the particle including the $SiO_x$ ($0<x<2$) and the Li compound, and thus may be provided in the form of a layer including particle-LiF including $SiO_x$ ($0<x<2$) and a Li compound.

The layer including LiF may be a LiF layer composed of LiF. Alternatively, the layer including LiF mainly includes LiF, and may include a small amount of impurities such as a lithium compound in addition to LiF.

Whether LiF is included in the negative electrode active material can be confirmed through X-ray diffraction analysis (XRD) or X-ray photoelectron spectroscopy (XPS).

In an exemplary embodiment of the present invention, the layer including LiF may be formed by a reaction of one or more lithium compounds selected from the group consisting of $Li_2O$, LiOH and $Li_2CO_3$ with HF. The formed LiF is uniformly formed on the particle surface, preferentially forms a layer on the surface (upper portion) of the lithium by-product to easily block the reaction between water and the lithium compound, and acts as an artificial SEI layer during the driving of the battery to have an effect of improving the service life performance.

Specifically, the layer including LiF may be formed by preparing silicon-based particles, and then acid-treating a lithium compound remaining near the surface of the silicon-based particles or the carbon layer, that is, a lithium by-product with HF.

In an exemplary embodiment of the present invention, the lithium compound may be one or more selected from the group consisting of $Li_2O$, LiOH and $Li_2CO_3$.

When the lithium compound is reacted with HF, the layer including LiF may be produced by one or more reactions of the following Formulae (1) to (3).

(1) $LiOH+HF \rightarrow LiF+H_2O$ (2) $Li_2O+2HF \rightarrow 2LiF+H_2O$ (3) $Li_2CO_3+2HF \rightarrow 2LiF+H_2CO_3$ The layer including LiF produced as described above is hardly soluble in water and can efficiently passivate the silicon-based particles in a water-based slurry, and has an effect of improving the water-based processability by preventing the Li compound included in the silicon-based particles from being eluted. In addition, the layer including LiF acts as an artificial SEI layer during the driving of a battery to have an effect of improving the service life performance of the battery.

In the present invention, the content and atomic ratio of the element on the surface of the negative electrode active material can be confirmed through XPS (Nexsa ESCA System, Thermo Fisher Scientific (ESCA-02)).

Specifically, after a survey scan spectrum and a narrow scan spectrum are obtained for each sample, the survey scan spectrum and the narrow scan spectrum may be obtained while performing a depth profile. The depth profile may be performed up to 3000 seconds using monatomic Ar ions, and the measurement and data processing conditions are as follows.

X-ray source: Monochromated Al K α (1486.6 eV)

X-ray spot size: 400 μm

Sputtering gun: Monatomic Ar (energy: 1000 eV, current: low, raster width: 2 mm)

Etching rate: 0.09 nm/s for $Ta_2O_5$

Operation Mode: CAE (Constant Analyzer Energy) mode

Survey scan: pass energy 200 eV, energy step 1 eV

Narrow scan: scanned mode, pass energy 50 eV, energy step 0.1 eV

Charge compensation: flood gun off

SF: Al THERM01

ECF: TPP-2M

BG subtraction: Shirley

In an exemplary embodiment of the present invention, the depth profile of the X-ray photoelectron spectroscopy (XPS) may be measured by performing the spectroscopy under the X-ray source of the monochromated Al K α at 0.09 nm/s for up to 3000 seconds.

In an exemplary embodiment of the present invention, when the negative electrode active material is analyzed by X-ray photoelectron spectroscopy (XPS), the atomic ratio (F/O ratio) of F relative to 0 is 0.45 or more. Specifically, the atomic ratio may be 0.48 or more, 0.55 or more, 0.6 or more or 0.7 or more, and 20 or less, 15 or less, 10 or less, 5 or less, 3 or less, 2 or less, 1.5 or less or 1.2 or less.

In an exemplary embodiment of the present invention, when the negative electrode active material is analyzed by X-ray photoelectron spectroscopy (XPS), the atomic ratio (F/C ratio) of F relative to C is 0.5 or less. Specifically, the atomic ratio may be 0.4 or less, 0.3 or less, 0.25 or less or 0.22 or less, and more than 0, 0.05 or more, 0.08 or more or 0.1 or more.

When the above F/O ratio and F/C ratio are satisfied, LiF is uniformly coated on the silicon-based particles, the particle coverage is increased, and thus the passivation effect is increased, and the lithium by-product is easily removed, and simultaneously, the exposure of the lithium by-product may be easily prevented, so that there is an effect that the water-based processability is efficiently improved and the capacity, efficiency and/or service life performance of the battery are improved In contrast, when the negative electrode active material does not satisfy the F/O ratio and/or F/C ratio, the particle coverage is low and LiF is formed partially thick, making it difficult to passivate the particles, and the water-based processability deteriorates because the lithium by-product is easily exposed, and accordingly, there is a problem in that the characteristics of the battery also deteriorate.

Therefore, when the F/O ratio and F/C ratio of the negative electrode active material satisfy the above-described ranges, optimum battery characteristics may be exhibited.

In an exemplary embodiment of the present invention, when the negative electrode active material is analyzed by X-ray photoelectron spectroscopy (XPS), F may be 0.1 at % to 0.3 at % based on 100 at % of the total elements.

In an exemplary embodiment of the present invention, when the negative electrode active material is analyzed by X-ray photoelectron spectroscopy (XPS), O may be 5 at % to 14 at % or 8 at % to 13.5 at % based on 100 at % of the total elements.

In an exemplary embodiment of the present invention, when the negative electrode active material is analyzed by X-ray photoelectron spectroscopy (XPS), C may be 50 at % to 65 at % or 55 at % to 61 at % based on 100 at % of the total elements.

In an exemplary embodiment of the present invention, when the negative electrode active material is analyzed by X-ray photoelectron spectroscopy (XPS), Si may be 6 at % to 8 at % or 7 at % to 8 at % based on 100 at % of the total elements.

In an exemplary embodiment of the present invention, when the negative electrode active material is analyzed by X-ray photoelectron spectroscopy (XPS), Li may be 10 at % to 25 at % or 10 at % to 20 at % based on 100 at % of the total elements.

In an exemplary embodiment of the present invention, the layer including LiF may be included in an amount of 0.5 parts by weight or more and 5 parts by weight or less based on total 100 parts by weight of the negative electrode active material. Specifically, the layer including LiF may be included in an amount of 0.7 parts by weight or more, 0.8 parts by weight or more, and 4 parts by weight or less, 3 parts by weight or less or 2.5 parts by weight or less.

In an exemplary embodiment of the present invention, LiF may be included in an amount of 0.5 parts by weight or more and 5 parts by weight or less based on total 100 parts by weight of the negative electrode active material. Specifically, LiF may be included in an amount of 0.7 parts by weight or more, 0.8 parts by weight or more, and 4 parts by weight or less, 3 parts by weight or less or 2.5 parts by weight or less.

When the content of LiF satisfies the above range, a layer is sufficiently formed on the surface (upper portion) of the lithium by-product to easily block the reaction between water and the lithium compound, and acts as an artificial SEI layer during the driving of the battery to have an effect of improving the service life performance.

In contrast, when LiF is included in an amount of less than 0.5 parts by weight, the content of LiF is so low that there is a problem in that the particles cannot be properly passivated and the lithium by-product reacts with moisture, resulting in poor water-based processability.

In an exemplary embodiment of the present invention, a lithium compound (lithium by-product) may be present between the silicon-based particles and the layer including LiF.

Specifically, the lithium compound (by-product) may mean a lithium compound remaining near the surface of the silicon-based particles or the carbon layer after preparing the silicon-based particles. As described above, even after the acid treatment process, a lithium by-product which has not been reacted with the acid may remain.

The lithium compound may include one or more selected from the group consisting of $Li_2O$, $LiOH$ and $Li_2CO_3$. As in the above-described reaction, the lithium compound is reacted with HF to form a layer including LiF, and a lithium compound (lithium by-product) produced by the remaining lithium which has not been reacted with HF may be present between the silicon-based particles and the layer containing LiF.

Whether the lithium compound is present between the silicon-based particles and the layer including LiF can be confirmed through X-ray diffraction analysis (XRD) or X-ray photoelectron spectroscopy (XPS).

The lithium compound (by-product) may be included in an amount of 5 parts by weight or less based on total 100 parts by weight of the negative electrode active material. Specifically, the lithium compound (by-product) may be included in an amount of 0.01 parts by weight to 5 parts by weight, 0.05 parts by weight to 2 parts by weight or 0.1 parts by weight to 1 part by weight. More specifically, the lithium compound (by-product) may be included in an amount of 0.1 parts by weight to 0.8 parts by weight or 0.1 parts by weight to 0.5 parts by weight. When the content of the lithium by-product satisfies the above range, side reactions in the slurry may be reduced, and the water-based processability may be improved by lowering the change in viscosity. In contrast, when the content of the lithium by-product is higher than the above range, there is a problem in that the slurry becomes basic during the slurry formation, which causes side reactions or changes in viscosity, and a water-based processability issue.

The content of the lithium compound (by-product) may be calculated by measuring the amount of a HCl solution in a specific interval where the pH changes during the process of titrating an aqueous solution including the negative electrode active material with the HCl solution using a titration group, and then calculating the amount of the lithium by-product.

The negative electrode active material may have an average particle diameter (D50) of 0.1 μm to 30 μm, specifically 1 μm to 20 μm, and more specifically 1 μm to 10 μm. When the above range is satisfied, the active material during charging and discharging is ensured to be structurally stable, and it is possible to prevent a problem in that the volume expansion/contraction level also becomes large as the particle diameter is excessively increased, and to prevent a problem in that the initial efficiency is reduced because the particle diameter is excessively small.

<Preparation Method of Negative Electrode Active Material>

An exemplary embodiment of the present invention provides a method for preparing the negative electrode active material, the method including: forming silicon-based particles including $SiO_x$ ($0<x<2$) and a Li compound and having a carbon layer provided on at least a part of the surface thereof; and forming a layer including LiF on at least a part of the silicon-based particles by reacting the silicon-based particles with a HF solution.

The silicon-based particles may be formed through forming preliminary particles by heating and vaporizing a Si powder and a $SiO_2$ powder under vacuum, and then depositing the vaporized mixed gas; forming a carbon layer on the surface of the formed preliminary particles; and mixing the preliminary particles on which the carbon layer is formed with a Li powder, and then heat-treating the resulting mixture.

Specifically, the mixed powder of the Si powder and the $SiO_2$ powder may be heat-treated at 1,300° C. to 1,800° C., 1,400° C. to 1,800° C. or 1,400° C. to 1,600° C. under vacuum.

The formed preliminary particles may have a form of SiO.

The carbon layer may be formed using chemical vapor deposition (CVD) using a hydrocarbon gas or by a method of carbonizing a material which is a carbon source.

Specifically, the carbon layer may be formed by introducing the formed preliminary particles into a reaction furnace, and then subjecting a hydrocarbon gas to chemical vapor deposition (CVD) at 600 to 1,200° C. The hydrocarbon gas may be at least one hydrocarbon gas selected from the group consisting of methane, ethane, propane and acetylene, and may be heat-treated at 900° C. to 1,000° C.

After the mixing of the preliminary particles on which the carbon layer is formed with the Li powder, heat-treating of the resulting mixture may be performed at 700° C. to 900° C. for 4 hours to 6 hours, and specifically at 800° C. for 5 hours.

The silicon-based particles may include a Li silicate, a Li silicide, a Li oxide, or the like as the above-described Li compound.

The particle size of the silicon-based particles may be adjusted by a method such as a ball mill, a jet mill, or an air current classification, and the method is not limited thereto.

A lithium compound (lithium by-product) is provided on at least a part of the surface of the silicon-based particles provided with the carbon layer as described above. Specifically, in the process of preparing the above-described silicon-based particles by forming the preliminary particles including $SiO_x$ ($0<x<2$), forming a carbon layer on the preliminary particles, and then doping the preliminary particles with Li, a lithium compound, that is, a lithium by-product formed by unreacted lithium remains near the surface of the silicon-based particles.

In an exemplary embodiment of the present invention, the method for preparing a negative electrode active material includes forming a layer including LiF on at least a part of the silicon-based particles by reacting the silicon-based particles with a Hf solution.

Specifically, in order to suppress a side reaction due to the unreacted lithium compound, forming a layer including LiF on at least a part of the silicon-based particles may be performed.

The formed LiF preferentially forms a layer on the surface (upper portion) of the lithium by-product to easily block the reaction between water and the lithium compound, and acts as an artificial SEI layer during the driving of the battery to have an effect of improving the service life performance.

In an exemplary embodiment of the present invention, the forming of the layer including LiF on at least a part of the silicon-based particles by reacting the silicon-based particles with the HF solution includes reacting the lithium compound provided on at least a part of the silicon-based particles with the HF solution.

Specifically, the layer including LiF may be formed by reacting a lithium compound provided on at least a part of the silicon-based particles with the HF solution.

The layer including LiF may be formed by reacting HF with lithium compounds ($Li_2O$, LiOH and $Li_2CO_3$) due to lithium which has not been reacted with preliminary particles when the above-described silicon-based particles are formed.

When the lithium compound is reacted with the HF solution, the layer including LiF may be produced by one or more reactions of the following Formulae (1) to (3).

(1) $LiOH + HF \rightarrow LiF + H_2O$
(2) $Li_2O + 2HF \rightarrow 2LiF + H_2O$
(3) $Li_2CO_3 + 2HF \rightarrow 2LiF + H_2CO_3$ The solution of the HF solution may be 0.03 M to 0.3 M, specifically, 0.05 M to 0.2 M.

The silicon-based particles and the HF solution may be mixed at a weight ratio of 1:1 to 1:10, specifically 1:5 to 1:10.

After the silicon-based particles and the HF solution are mixed, heat treatment may be performed at 200° C. to 500° C., specifically, at 250° C. to 350° C.

When the layer including LiF is formed by a chemical reaction of the lithium compound with LiF as described above, LiF is uniformly formed on the particle surface, and the formed LiF preferentially forms a layer on the surface (upper portion) of the lithium by-product to easily block the reaction between water and the lithium compound, and acts as an artificial SEI layer during the driving of the battery to have an effect of improving the service life performance.

<Negative Electrode>

The negative electrode according to an exemplary embodiment of the present invention may include the above-described negative electrode active material.

Specifically, the negative electrode may include a negative electrode current collector and a negative electrode active material layer disposed on the negative electrode current collector. The negative electrode active material layer may include the negative electrode active material. Furthermore, the negative electrode active material layer may further include a binder, a thickener and/or a conductive material.

The negative electrode active material layer may be formed by applying a negative electrode slurry including a negative electrode active material, a binder, a thickener and/or a conductive material to at least one surface of a current collector and drying and rolling the current collector.

The negative electrode slurry may further include an additional negative electrode active material.

As the additional negative electrode active material, a compound capable of reversible intercalation and deintercalation of lithium may be used. Specific examples thereof include a carbonaceous material such as artificial graphite, natural graphite, graphized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be undoped and doped with lithium such as $SiO_\beta$ ($0<\beta<2$), $SnO_2$, vanadium oxide, lithium titanium oxide, and lithium vanadium oxide; or a composite including the metallic compound and the carbonaceous material such as a Si—C composite or a Sn—C composite, and the like, and any one thereof or a mixture of two or more thereof may be used. Furthermore, a metallic lithium thin film may be used as the negative electrode active material. Alternatively, both low crystalline carbon and high crystalline carbon, and the like may be used as the carbon material. Typical examples of the low crystalline carbon include soft carbon and hard carbon, and typical examples of the high crystalline carbon include irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature fired carbon such as petroleum or coal tar pitch derived cokes.

The additional negative electrode active material may be a carbon-based negative electrode active material.

In an exemplary embodiment of the present invention, a weight ratio of the negative electrode active material and the additional negative electrode active material included in the negative electrode slurry may be 10:90 to 90:10, specifically 10:90 to 50:50.

The negative electrode slurry may include a solvent for forming a negative electrode slurry. Specifically, the solvent for forming a negative electrode slurry may include at least one selected from the group consisting of distilled water, ethanol, methanol, and isopropyl alcohol, specifically distilled water in terms of facilitating the dispersion of the components.

The negative electrode current collector is sufficient as long as the negative electrode current collector has conductivity without causing a chemical change to the battery, and is not particularly limited. For example, as the current collector, it is possible to use copper, stainless steel, aluminum, nickel, titanium, fired carbon, or a material in which aluminum or stainless steel whose surface is surface-treated with carbon, nickel, titanium, silver, and the like. Specifically, a transition metal, such as copper or nickel which adsorbs carbon well, may be used as a current collector. Although the current collector may have a thickness of 6 μm to 20 μm, the thickness of the current collector is not limited thereto.

The binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene-butadiene rubber (SBR), fluorine rubber, polyacrylic acid and a material in which the hydrogen thereof is substituted with Li, Na, Ca, or the like, and may also include various copolymers thereof.

The conductive material is not particularly limited as long as the conductive material has conductivity without causing a chemical change to the battery, and for example, it is possible to use graphite such as natural graphite or artificial graphite; carbon black such as acetylene black, Ketjen black, channel black, furnace black, lamp black, and thermal black; a conductive fiber such as carbon fiber or metal fiber; a conductive tube such as a carbon nanotube; a metal powder such as a carbon fluoride powder, an aluminum powder, and a nickel powder; a conductive whisker such as zinc oxide and potassium titanate; a conductive metal oxide such as titanium oxide; a conductive material such as polyphenylene derivatives, and the like.

The thickener may be carboxymethyl cellulose (CMC) and is not limited thereto, and a thickener used in the art may be appropriately employed.

<Secondary Battery>

A secondary battery according to an exemplary embodiment of the present invention may include the above-described negative electrode according to an exemplary embodiment. Specifically, the secondary battery may include a negative electrode, a positive electrode, a separator interposed between the positive electrode and the negative electrode, and an electrolyte solution, and the negative electrode is the same as the above-described negative electrode. Since the negative electrode has been previously described, a specific description thereof will be omitted.

The positive electrode may include a positive electrode current collector and a positive electrode active material layer formed on the positive electrode current collector and including the positive electrode active material.

In the positive electrode, the positive electrode current collector is not particularly limited as long as the positive electrode current collector has conductivity without causing a chemical change to the battery, and for example, it is possible to use stainless steel, aluminum, nickel, titanium, fired carbon, or a material in which the surface of aluminum or stainless steel is surface-treated with carbon, nickel, titanium, silver, and the like. Further, the positive electrode current collector may typically have a thickness of 3 to 500 μm, and the adhesion of the positive electrode active material may also be enhanced by forming fine irregularities on the surface of the current collector. For example, the positive electrode current collector may be used in various forms such as a film, a sheet, a foil, a net, a porous body, a foam body, and a non-woven fabric body.

The positive electrode active material may be a typically used positive electrode active material. Specifically, the positive electrode active material includes: a layered compound such as lithium cobalt oxide ($LiCoO_2$) and lithium nickel oxide ($LiNiO_2$) or a compound substituted with one or more transition metals; a lithium iron oxide such as $LiFe_3O_4$; a lithium manganese oxide such as chemical formula $Li_{1+c1}Mn_{2-c1}O_4$ ($0 \leq c1 \leq 0.33$), $LiMnO_3$, $LiMn_2O_3$, and $LiMnO_2$; a lithium copper oxide ($Li_2CuO_2$); a vanadium oxide such as $LiV_3O_8$, $V_2O_5$, and $Cu_2V_2O_7$; a Ni site type lithium nickel oxide expressed as chemical formula $LiNi_{1-c2}M_{c2}O_2$ (here, M is at least one selected from the group consisting of Co, Mn, Al, Cu, Fe, Mg, B and Ga, and c2 satisfies $0.01 \leq c2 \leq 0.3$); a lithium manganese composite oxide expressed as chemical formula $LiMn_{2-c3}M_{c3}O_2$ (here, M is at least any one selected from the group consisting of Co, Ni, Fe, Cr, Zn and Ta, and c3 satisfies $0.01 \leq c3 \leq 0.1$) or $Li_2Mn_3MO_8$ (here, M is at least any one selected from the group consisting of Fe, Co, Ni, Cu and Zn.); $LiMn_2O_4$ in which Li of the chemical formula is partially substituted with an alkaline earth metal ion, and the like, but is not limited thereto. The positive electrode may be Li-metal.

The positive electrode active material layer may include a positive electrode conductive material and a positive electrode binder together with the above-described positive electrode active material.

In this case, the positive electrode conductive material is used to impart conductivity to the electrode, and can be used without particular limitation as long as the positive electrode conductive material has electron conductivity without causing a chemical change in a battery to be constituted. Specific examples thereof include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as zinc oxide and potassium titanate; a conductive metal oxide such as titanium oxide; or a conductive polymer such as a polyphenylene derivative, and any one thereof or a mixture of two or more thereof may be used.

Alternatively, the positive electrode binder serves to improve the bonding between positive electrode active material particles and the adhesion between the positive electrode active material and the positive electrode current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used.

The separator separates the negative electrode and the positive electrode and provides a passage for movement of lithium ions, and can be used without particular limitation as long as the separator is typically used as a separator in a secondary battery, and in particular, a separator having an excellent ability to retain moisture of an electrolyte solution as well as low resistance to ion movement in the electrolyte solution is preferable. Specifically, it is possible to use a porous polymer film, for example, a porous polymer film formed of a polyolefin-based polymer such as an ethylene homopolymer, a propylene homopolymer, an ethylene/butene copolymer, an ethylene/hexene copolymer, and an ethylene/methacrylate copolymer, or a laminated structure of two or more layers thereof. In addition, a typical porous non-woven fabric, for example, a non-woven fabric made of a glass fiber having a high melting point, a polyethylene terephthalate fiber, and the like may also be used. Furthermore, a coated separator including a ceramic component or a polymeric material may be used to secure heat resistance or mechanical strength and may be selectively used as a single-layered or multi-layered structure.

Examples of the electrolyte solution include an organic liquid electrolyte, an inorganic liquid electrolyte, a solid polymer electrolyte, a gel-type polymer electrolyte, a solid inorganic electrolyte, a molten-type inorganic electrolyte, and the like, which can be used in the preparation of a lithium secondary battery, but are not limited thereto.

Specifically, the electrolyte solution may include a non-aqueous organic solvent and a metal salt.

As the non-aqueous organic solvent, it is possible to use, for example, an aprotic organic solvent, such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

In particular, among the carbonate-based organic solvents, cyclic carbonates ethylene carbonate and propylene carbonate may be preferably used because the cyclic carbonates have high permittivity as organic solvents of a high viscosity and thus dissociate a lithium salt well, and such a cyclic carbonate may be more preferably used since the cyclic carbonate may be mixed with a linear carbonate of a low viscosity and low permittivity such as dimethyl carbonate and diethyl carbonate in an appropriate ratio and used to prepare an electrolyte solution having a high electric conductivity.

As the metal salt, a lithium salt may be used, the lithium salt is a material which is easily dissolved in the non-aqueous electrolyte solution, and for example, as an anion of the lithium salt, it is possible to use one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In the electrolyte solution, for the purpose of improving the service life characteristics of a battery, suppressing the decrease in battery capacity, and improving the discharge capacity of the battery, one or more additives, such as, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be further included in addition to the above electrolyte solution constituent components.

According to still another exemplary embodiment of the present invention, provided are a battery module including the secondary battery as a unit cell, and a battery pack including the same. The battery module and the battery pack include the secondary battery which has high capacity, high rate properties, and cycle properties, and thus, may be used as a power source of a medium-and-large sized device selected from the group consisting of an electric car, a hybrid electric vehicle, a plug-in hybrid electric vehicle, and a power storage system.

MODE FOR INVENTION

Hereinafter, the present specification will be described in detail with reference to Examples for specifically describing the present specification. However, the Examples according to the present specification may be modified in various forms, and it is not interpreted that the scope of the present application is limited to the Examples described in detail below. The Examples of the present application are provided to explain the present specification more completely to a person with ordinary skill in the art.

EXAMPLES AND COMPARATIVE EXAMPLES

Example 1

After 94 g of a powder in which Si and $SiO_2$ were mixed at a molar ratio of 1:1 was mixed in a reaction furnace, the resulting mixture was heated under vacuum at a sublimation temperature of 1,400° C. Thereafter, a mixed gas of the vaporized Si and $SiO_2$ was reacted in a cooling zone in a vacuum state having a cooling temperature of 800° C. and condensed into a solid phase. Next, particles having a size of 6 μm were prepared by pulverizing the aggregated particles using a ball mill for 3 hours. Thereafter, the particles were positioned in a hot zone of a CVD apparatus while maintaining an inert atmosphere by flowing Ar gas, and the methane was blown into the hot zone at 900° C. using Ar as a carrier gas and reacted at $10^{-1}$ torr for 5 hours to form a carbon layer on the particle surface. Thereafter, after 6 g of Li metal powder was added to the carbon layer-formed particles and mixed, silicon-based particles including Li were prepared by performing an additional heat treatment at a temperature of 800° C. in an inert atmosphere.

After the silicon-based particles and a 0.1 M HF solution were mixed at a weight ratio of 1:7, the resulting solution was stirred for 1 hour, filtered, dried, and heat-treated at 300° C. to prepare a negative electrode active material into which a LiF layer had been introduced.

Example 2

A negative electrode active material was prepared in the same manner as in Example 1, except that a 0.15 M HF solution was used.

Example 3

A negative electrode active material was prepared in the same manner as in Example 1, except that a 0.05 M HF solution was used.

Example 4

A negative electrode active material was prepared in the same manner as in Example 1, except that a 0.2 M HF solution was used.

Comparative Example 1

A negative electrode active material was prepared in the same manner as in Example 1, except for the introducing of the LiF layer.

Comparative Example 2

A negative electrode active material was prepared in the same manner as in Example 1, except that during the introduction of the LiF layer, the LiF powder and the silicon-based particles were mixed at a weight ratio of 1.5:100, and then a LiF layer was introduced into the surface of the silicon-based particles by ball mill.

Comparative Example 3

A negative electrode active material was prepared in the same manner as in Example 1, except that during the introduction of the LiF layer, the LiF powder and the silicon-based particles were mixed at a weight ratio of 0.4:100, and then a LiF layer was introduced into the surface of the silicon-based particles by ball mill.

<Measurement of Content of Carbon Layer>

The content of the carbon layer was analyzed using a CS-analyzer (CS-800, Eltra).

<Measurement of Content and Atomic Ratio of Element by X-Ray Photoelectron Spectroscopy (XPS)>

The content (at %) and atomic ratio of the element on the surface of the negative electrode active material were confirmed through XPS (Nexsa ESCA System, Thermo Fisher Scientific (ESCA-02)).

Specifically, a survey scan spectrum and a narrow scan spectrum were obtained for each sample, and then the survey scan spectrum and the narrow scan spectrum were obtained while performing a depth profile. Depth profile was performed up to 3000 seconds using Monatomic Ar ion. Measurement and data processing conditions are as follows.

X-ray source: Monochromated Al K $\alpha$ (1486.6 eV)

X-ray spot size: 400 µm

Sputtering gun: Monatomic Ar (energy: 1000 eV, current: low, raster width: 2 mm)

Etching rate: 0.09 nm/s for $Ta_2O_5$

Operation Mode: CAE (Constant Analyzer Energy) mode

Survey scan: pass energy 200 eV, energy step 1 eV

Narrow scan: scanned mode, pass energy 50 eV, energy step 0.1 eV

Charge compensation: flood gun off

SF: Al THERMO1

ECF: TPP-2M

BG subtraction: Shirley

As a result of the aforementioned measurements, the content and atomic ratio of each element were calculated based on the total content of 100 at % of the measured elements.

<Measurement of Content of Li Included in Negative Electrode Active Material>

The content of the Li atom was confirmed by an ICP analysis using an inductively coupled plasma atomic emission spectrometer (ICP-OES, AVIO 500 from Perkin-Elmer 7300).

<Analysis of Content of LiF>

20 ml to 200 ml of a sample was aliquoted into a corning tube and eluted by shaking with 30 g of ultrapure water for 24 hours. In this case, additional dilutions were made such that the sample concentration fell within the standard material calibration curve (1 mg/kg), if necessary. After the F content was measured using IC6000 (Thermo Fisher Scientific) under the following analysis conditions, the content of LiF was calculated through the measured F content.

[Analytical Conditions]

Column: IonPacAS18 (4×250 mm), IonPacAG18 (4×50 mm)

Eluent type KOH (30.5 mM), Eluent flow rate: 1 mL/min

Detector: Suppressed Conductivity Detector, SRS current: 76 mA, Injection volume: 25 µl The configurations of the negative electrode active materials prepared in the Examples and Comparative Examples are shown in the following Table 1.

TABLE 1

| | Part by weight of carbon layer (based on total 100 parts by weight of negative electrode active material) | Part by weight of LiF (based on 100 parts by weight of negative electrode active material) | Part by weight of Li (based on 100 parts by weight of negative electrode active material) | F/O ratio (Atomic ratio) | F/C ratio (Atomic ratio) | F content (at %) | O content (at %) | C content (at %) | Si content (at %) | Li content (at %) |
|---|---|---|---|---|---|---|---|---|---|---|
| Example 1 | 3.4 | 1.54 | 8.1 | 0.8 | 0.16 | 9.25 | 11.2 | 58.2 | 7.2 | 14.2 |
| Example 2 | 3.4 | 2.33 | 8.1 | 1.2 | 0.20 | 11.1 | 9.4 | 55.4 | 7 | 17.2 |
| Example 3 | 3.5 | 1.15 | 8.1 | 0.7 | 0.15 | 8.9 | 12.2 | 58.2 | 7.1 | 13.6 |
| Example 4 | 3.5 | 0.89 | 8.2 | 0.5 | 0.11 | 6.6 | 13.5 | 60.5 | 7.6 | 11.8 |
| Comparative Example 1 | 3.5 | 0 | 8.1 | 0 | 0.00 | 0 | 16.2 | 73.2 | 7.3 | 3.3 |
| Comparative Example 2 | 3.4 | 1.45 | 9.4 | 1.4 | 0.62 | 21.6 | 15.2 | 35 | 2.1 | 26.1 |
| Comparative Example 3 | 3.5 | 0.4 | 8.8 | 0.4 | 0.11 | 6.8 | 15.6 | 62.5 | 6.5 | 8.6 |

<Experimental Example: Evaluation of discharge capacity, initial efficiency, and service life (capacity retention rate) characteristics>

Manufacture of Negative Electrode

A mixture of the composite negative electrode active material prepared in Example 1 as the negative electrode material and graphite (average particle diameter (D50): 20 μm) as the carbon-based active material at a weight ratio of 15:85 was used.

The negative electrode material, styrene-butadiene rubber (SBR) as a binder, Super C65 as a conductive material, and carboxymethyl cellulose (CMC) as a thickener were mixed at a weight ratio of 96:2:1:1, and the resulting mixture was added to distilled water as a solvent for forming a negative electrode slurry to prepare a negative electrode slurry.

One surface of a copper current collector (thickness: 15 μm) as a negative electrode current collector was coated with the negative electrode slurry in a loading amount of 3.6 mAh/cm², and the copper current collector was roll-pressed and dried in a vacuum oven at 130° C. for 10 hours to form a negative electrode active material layer (thickness: 50 μm), which was employed as a negative electrode according to Example 1 (thickness of the negative electrode: 65 μm).

Furthermore, the negative electrodes of Examples 2 to 4 and Comparative Examples 1 to 3 were manufactured in the same manner as in Example 1, except that the negative electrode active materials of Examples 2 to 4 and Comparative Examples 1 to 3 were used, respectively, instead of the negative electrode active material of Example 1.

Manufacture of Secondary Battery

A lithium metal foil was prepared as a positive electrode.

Coin-type half cells of Examples 1 to 4 and Comparative Examples 1 to 3 were manufactured, respectively, by interposing a porous polyethylene separator between the negative electrodes of Examples 1 to 4 and Comparative Examples 1 to 3 manufactured above and the positive electrode and injecting an electrolytic solution thereinto.

As the electrolyte solution, a product obtained by dissolving 0.5 wt % of vinylene carbonate (VC) in a solution of ethyl methyl carbonate (EMC) and ethylene carbonate (EC) mixed at a volume ratio of 7:3, and dissolving $LiPF_6$ at a concentration of 1 M was used.

Evaluation of Discharge Capacity, Initial Efficiency, and Service Life (Capacity Retention Rate) Characteristics The discharge capacities, initial efficiencies and cycle capacity retention rates of the secondary batteries manufactured in Examples 1 to 4 and Comparative Examples 1 to 3 were evaluated using an electrochemical charger/discharger.

The cycle capacity retention rate was performed at a temperature of 25° C., the first and second cycles were charged and discharged at 0.1 C, and the third and subsequent cycles were charged and discharged at 0.5 C (charging conditions: CC/CV, 5 mV/0.005 C cut-off, discharging conditions: CC, 1.5 V cut off).

The discharge capacity (mAh/g) and initial efficiency (%) were derived from the results during one-time charge/discharge.

The capacity retention rate was calculated as follows.

$$\text{Capacity retention rate (\%)} = \{(\text{Discharge capacity in the Nth cycle})/(\text{Discharge capacity in the 1st cycle})\} \times 100$$

(In the equation, N is an integer of 1 or higher.)

The 50th cycle capacity retention rate (%) is shown in the following Table 2.

TABLE 2

| Battery | Discharge capacity (mAh/g) | Initial efficiency (%) | Capacity retention rate (%) |
|---|---|---|---|
| Example 1 | 506 | 91.2 | 93.1 |
| Example 2 | 506 | 91.3 | 93.6 |
| Example 3 | 506 | 91.2 | 92.8 |
| Example 4 | 506 | 91.1 | 91.6 |
| Comparative Example 1 | 502 | 85.6 | 76.5 |
| Comparative Example 2 | 503 | 87.8 | 84.6 |
| Comparative Example 3 | 506 | 88.2 | 86.1 |

Examples 1 to 4 had a layer including LiF provided on the silicon-based particles and satisfied an F/O ratio of 0.45 or more and an F/C ratio of 0.5 or less, and it could be confirmed that the discharge capacity, the initial efficiency and the capacity retention rate are excellent because the layer including LiF can be uniformly coated on the surface of the silicon-based particles to block the reaction between the lithium by-product and moisture.

In contrast, when the LiF layer is not provided on the surface of the silicon-based particles as in Comparative Example 1, it could be confirmed that the discharge capacity, initial efficiency and capacity retention rate of the battery deteriorate because the water-based slurry processability becomes poor due to the reaction between the lithium by-product of the negative electrode active material and moisture.

In the case of Comparative Example 2, a layer including LiF was formed on the silicon-based particles, but the F/C ratio showed a high value of 0.62. From the foregoing, LiF is formed partially thick, particles are not readily passivated, and the lithium by-product is easily exposed, resulting in poor water-based processability, and from the foregoing, it could be confirmed that the discharge capacity, initial efficiency and capacity retention rate of the battery deteriorate.

In the case of Comparative Example 3, a layer including LiF was formed on the surface of the silicon-based particles, but the content of LiF was low and the F/C ratio showed a low value of 0.4. From the foregoing, LiF is formed partially on the particles, particles are not readily passivated, and the lithium by-product is easily exposed, resulting in poor water-based processability, and from the foregoing, it could be confirmed that the discharge capacity, initial efficiency and capacity retention rate of the battery deteriorate.

The invention claimed is:

1. A negative electrode active material comprising:
   silicon-containing particles comprising $SiO_x$, wherein $0 < x < 2$, and a Li compound, and a carbon layer present on at least a part of a surface of the silicon-containing particles; and
   a layer comprising LiF present on at least a part of the silicon-containing particles having the carbon layer,
   wherein during analysis by X-ray photoelectron spectroscopy (XPS), an atomic ratio (F/O ratio) of F relative to O is 0.45 or more and an atomic ratio (F/C ratio) of F relative to C is 0.5 or less.

2. The negative electrode active material of claim 1, wherein when the negative electrode active material is analyzed by X-ray photoelectron spectroscopy (XPS), the atomic ratio (F/O ratio) of F relative to O is 0.48 or more and 2 or less.

3. The negative electrode active material of claim 1, wherein when the negative electrode active material is analyzed by X-ray photoelectron spectroscopy (XPS), the atomic ratio (F/C ratio) of F relative to C is more than 0 and 0.3 or less.

4. The negative electrode active material of claim 1, wherein the layer comprising LiF is present in an amount of 0.5 parts by weight to 5 parts by weight based on a total of 100 parts by weight of the negative electrode active material.

5. The negative electrode active material of claim 1, wherein a lithium compound is present between the silicon-containing particles and the layer comprising LiF.

6. The negative electrode active material of claim 5, wherein the lithium compound comprises one or more selected from the group consisting of $Li_2O$, LiOH and $Li_2CO_3$.

7. The negative electrode active material of claim 1, wherein the layer comprising LiF is formed by a reaction of one or more lithium compounds selected from the group consisting of $Li_2O$, LiOH and $Li_2CO_3$ with HF.

8. The negative electrode active material of claim 1, wherein Li is present in an amount of 0.1 parts by weight to 40 parts by weight based on a total of 100 parts by weight of the negative electrode active material.

9. The negative electrode active material of claim 1, wherein the carbon layer is present in an amount of 0.1 parts by weight to 50 parts by weight based on a total of 100 parts by weight of the negative electrode active material.

10. A method for preparing the negative electrode active material according to claim 1, the method comprising:
　　forming silicon-containing particles comprising $SiO_x$, wherein 0<x<2, and a Li compound and having a carbon layer provided on at least a part of the surface thereof; and
　　forming a layer comprising LiF on at least a part of the silicon-containing particles by reacting the silicon-containing particles with a HF solution.

11. The method of claim 10, wherein the forming of the layer comprising LiF on at least a part of the silicon-containing particles by reacting the silicon-containing particles with the HF solution comprises reacting the lithium compound provided on at least a part of the silicon-containing particles with the HF solution.

12. A negative electrode comprising the negative electrode active material according to claim 1.

13. A secondary battery comprising the negative electrode according to claim 12.

* * * * *